United States Patent [19]

Lee

[11] Patent Number: 5,598,753
[45] Date of Patent: Feb. 4, 1997

[54] EAGLE WING TIPS TAMPER-PROOF FASTENER AND DRIVER TOOL

[76] Inventor: James S. Lee, 1995 Vanguard Dr., Camarillo, Calif. 93010

[21] Appl. No.: 384,922

[22] Filed: Feb. 7, 1995

[51] Int. Cl.$^6$ .................................................. B25B 23/00
[52] U.S. Cl. .................. 81/460; 81/451; 411/404; 411/911
[58] Field of Search ........................... 81/460, 461, 451, 81/436, 176.1, 176.15, 176.2; 411/403–405, 408–410, 910, 911

[56] References Cited

U.S. PATENT DOCUMENTS

| | | |
|---|---|---|
| 3,302,672 | 2/1967 | Walton .............................. 411/403 X |
| 3,331,274 | 7/1967 | Walton .................................. 411/403 |
| 4,018,111 | 4/1977 | Goldhaber . |
| 4,125,051 | 11/1978 | Herkes et al. . |
| 4,171,662 | 10/1979 | Simone et al. . |
| 4,258,596 | 3/1981 | Bisbing et al. . |
| 4,426,896 | 1/1984 | Kesselman . |
| 4,430,035 | 2/1984 | Rodseth . |
| 4,827,811 | 5/1989 | Vickers . |
| 4,938,108 | 7/1990 | Mekler . |
| 5,269,208 | 12/1993 | Kolvites et al. . |

*Primary Examiner*—D. S. Meislin
*Attorney, Agent, or Firm*—Eugene Oak, Ph.D., J.D.

[57] ABSTRACT

An eagle wing tips tamper-proof fastener and driver tool with complementary driver head contact for operating the same. A conventional threaded shank is perpendicularly connected to a substantially flat head. The head comprises a plurality of recessed channels numbering three and the channels radially curve outwards from a common center point. In one embodiment, the substantially vertical right and left walls of each channel allow application of torque with the driver tool in both directions. In an alternate embodiment, the substantially vertical right wall and the surface of the substantially inclined left wall allow application of torque with the driver tool to the right only.

4 Claims, 5 Drawing Sheets

EAGLE WING TIPS TAMPER-PROOF FASTENER AND DRIVER TOOL

BACKGROUND OF THE INVENTION

1. Field of the Invention

The present invention generally relates to fasteners and tools for operating such fasteners and particularly to tamper-proof fastener and a driver tool with complementary driver head contact for operating the same.

2. Description of the Prior Art

Fasteners of various types have been developed in the art to meet various fastening requirements. Examples of conventional fasteners are screws, bolts and rivets. Depending on requirements and applications, screws and bolts with various head designs and patterns such as slotted, Phillips and hex have been developed. These conventional fasteners, however, are easily operated on and therefore tampered with as driver heads with corresponding head designs and patterns are readily available.

For special applications where the fasteners as applied need to be tamper-proof, fasteners with special head designs and driver tools with complementary head designs must be used.

The prior art discloses tamper-proof fastener and driver tool of various head designs and means.

U.S. Pat. No. 5,269,208 to Kolvites et al. discloses a tamper-proof fastener whose head has a generally frusto-conical shape defining a circular flat top and a circular base of larger diameter, three short noses separated 120 degrees apart projecting from the sloped side of the drive head. The head of the drive tool for this fastener has a complementary frusto-conical socket.

U.S. Pat. No. 4,938,108 to Mekler discloses a theft resistant fastener system wherein both rotatable wrench and head of fastener have at least three ball-and-socket joints distributed about the fastener axis.

U.S. Pat. No. 4,827,811 to Vickers discloses a tamper-resistant torque-responsive fastener having a socket which is of substantially triangular shape with rounded corners and curved sides disposed on the head. Also provided is a driving tool for operating the fastener.

U.S. Pat. No. 4,430,035 to Rodseth discloses a fastener driver head and tool and coupling therebetween wherein fastener driver head comprises a substantially circular disc-shaped base portion, a plurality of frustoconical portions integrally formed with the base portion and a plurality of ribs alternating with the frustoconical portions. The mating driver tool has a recessed driving head or socket substantially complementary with the fastener head.

U.S. Pat. No. 4,426,896 to Kesselman discloses a tool for removing an in situ tamper-proof fastener of the type disclosed in U.S. Pat. Nos. 4,037,515 and 4,225,165 and includes spikes located and oriented on a body to snag the head of the fastener so that rotation imparted to the body is transferred to the fastener.

U.S. Pat. No. 4,258,596 to Bisbing et al. discloses a tamper-resistant fastener wherein the fastener head has three sockets, at least one of which is eccentrically disposed with respect to the other two. The fastener may be attached and removed only with the application of a special tool having a male portion adapted for matable engagement with the fastener head.

U.S. Pat. No. 4,171,662 to Simone et al. discloses a security screw wherein its head has an odd number of sides arranged symmetrically with respect to the center of the head and inclined to the axis of the screw. The screw is removed by the use of a matching socket wrench.

U.S. Pat. No. 4,125,051 to Herkes et al. discloses a tamperproof fastener having a low profile head whose upper surface is configured to include a very short cylindrical boss, coaxial of the fastener and a plurality of ribs extending radially outwardly therefrom formed on an otherwise flat, circular flange. The ribs include a perpendicularly disposed driving surface of low height extending from the flat surface and an angled camming surface intersecting with the driving surface.

U.S. Pat. No. 4,018,111 to Goldhaber disclosed a tamper resistant fastener having a head portion of a circular contour, the upper surface of which is provided with a circular bore at a location which eccentrically disposed with respect to the longitudinal axis of the shank portion of the screw. The tool has a coupling key at its end which is received within the head bore of the screw such that rotation of the handle of the tool will cause rotation of the screw.

Although these prior arts disclose various tamper-resistant and tamper=proof methods and devices, none of them disclosed a tamper-proof fastener and driver tool for operating the same of the particular type as disclosed and claimed hereinafter.

It is thus a primary objective of the present invention to provide a tamper-proof fastener and driver tool for operating the same having a novel driving contact wherein a fastener so formed can only be operated by a complementary driver tool.

Another objective of the present invention is to provide a tamper-proof fastener and driver tool for operating the same wherein it is virtually impossible to operate on the fastener without the complementary driver tool.

Yet another objective of the present invention is to provide a tamper-proof fastener and driver tool for operating the same wherein the fastener can de removed non-destructively only with an authorized driver tool having complementary driving contact.

SUMMARY OF THE INVENTION

According to the present invention, there is provided a tamper-proof fastener and a driver tool for operating the same wherein the fastener comprises a head and a threaded shank integrally and perpendicularly connected thereto. In the first embodiment, the head of the fastener has three recessed channels each radially curving outwards from a common center point at the center of the head. Each channel curves to a radial endpoint which lies between half radius and full radius. The imaginary radial lines connecting the center point to each endpoint are 120 degrees from one another. The right vertical wall of each channel smoothly curves to the right as it extends to the endpoint. The left vertical wall of each channel also smoothly curves to the right as it extends out to meet and join the endpoint of the right wall. The radius of curvature of the left wall is equal to that of the right wall. At the center point where the three recessed channels meet is a circular, flat surface whose diameter is approximately half of the broadest width of each channel. The circular flat surface at the top surface of the fastener head, the bottom surface of each channel rises linearly from the center to the common endpoint of each channel. A driver tool with complementary driving contact is used to apply and remove the fastener.

In an alternative embodiment, the entire left wall of each channel is, rather than being vertical, milled to substantially inclined outwards from its bottom edge. A driver tool with complementary driving contact is to be used to apply the fastener. Once applied, the fastener of the alternative embodiment is virtually irremovable, regardless of the type and choice of driver tool employed, as torquing the driver tool counter-clockwise will only cause slippage of the fool against the inclined surface of the left wall.

These together with other objects of the invention are pointed out clearly in the claims annexed to and forming a part of this disclosure. For a better understanding of the present invention, its operating advantages and the specific objects attained by its use, references should be made to the accompanying drawings and descriptive matter in which there are illustrated preferred embodiments of the invention.

BRIEF DESCRIPTION OF THE DRAWING

For a better understanding of the principle and nature of the present invention, references should be made to the following detailed description taken in consideration of the accompanying drawings in which.

DETAILED DESCRIPTION OF THE PREFERRED EMBODIMENT

Figure 1:
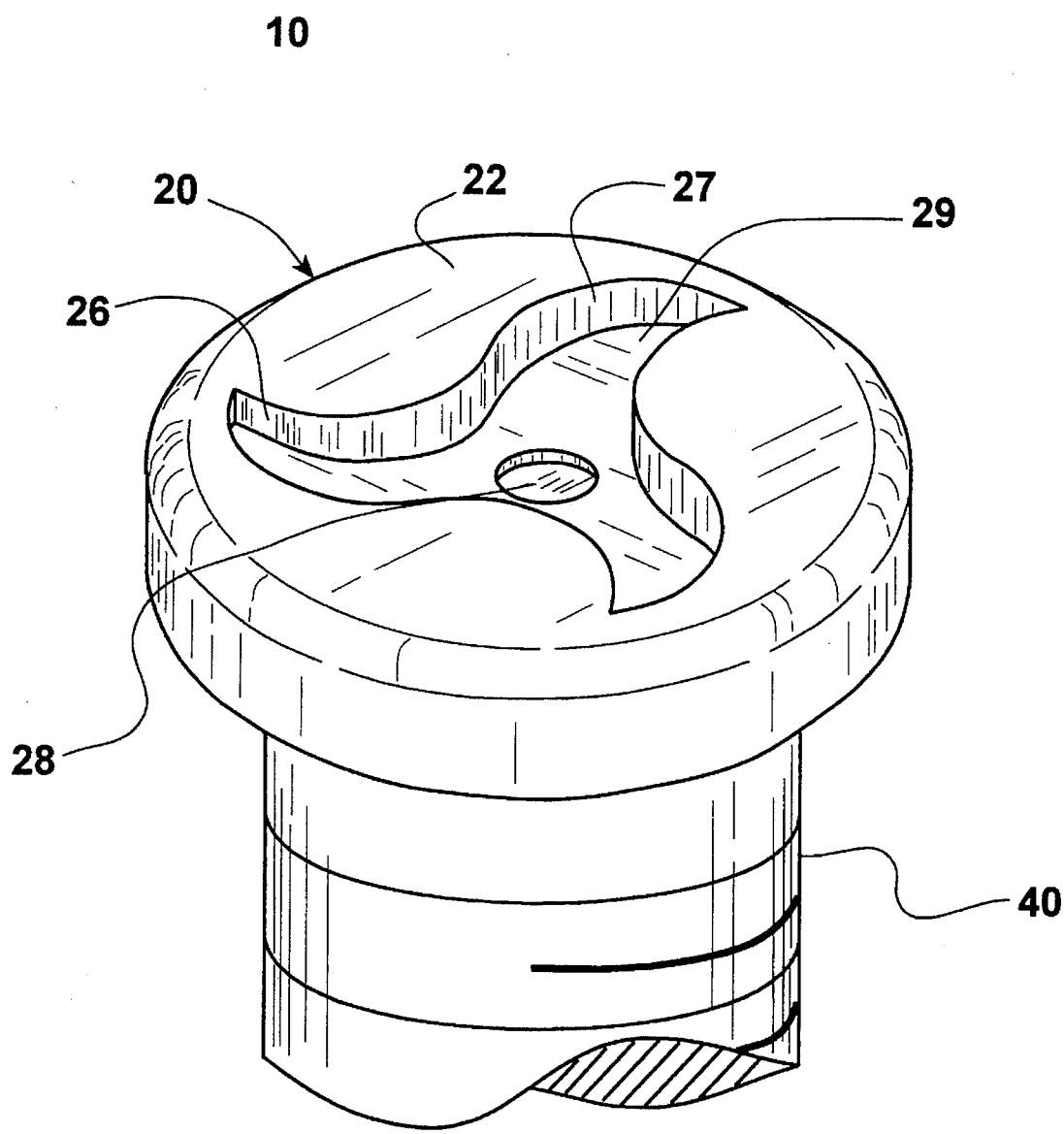
FIG. 1 is a perspective view of first embodiment of the eagle wing tips tamper-proof fastener.
Figure 2:
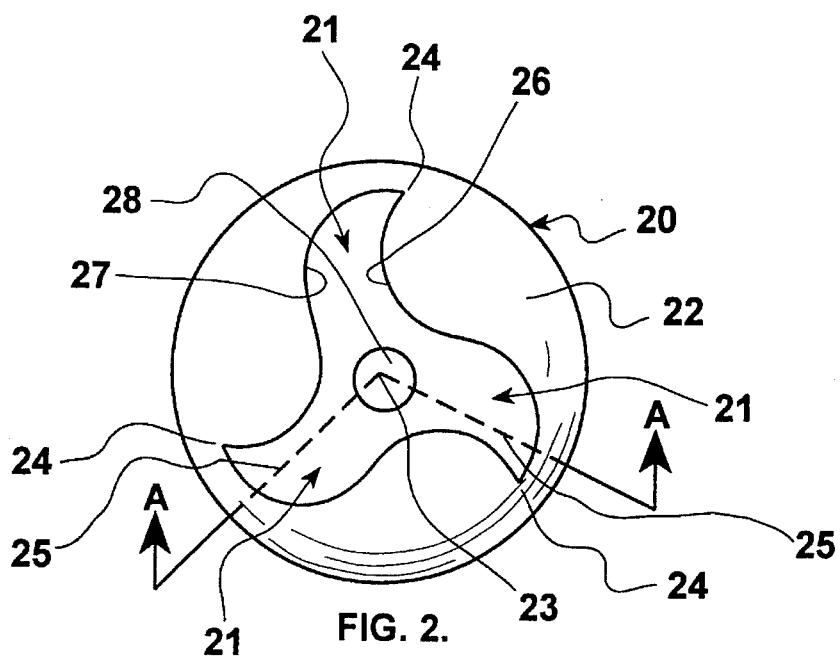
FIG. 2 is a top view of the head of the first embodiment of the eagle wing tips tamper-proof fastener.
Figure 3:
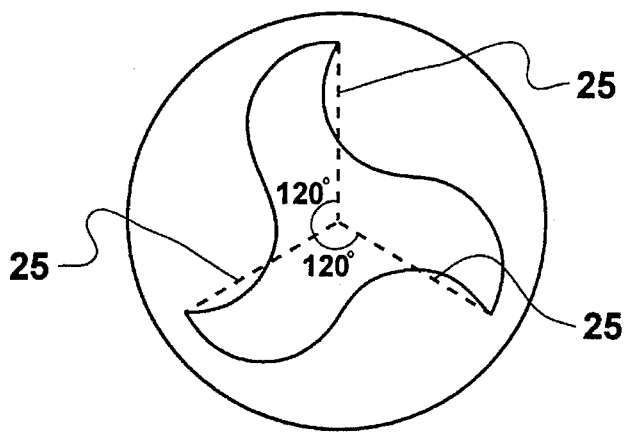
FIG. 3 is a top view of the head of the eagle wing tips tamper-proof fastener illustrating the angles formed by three recess channels.
Figure 4:
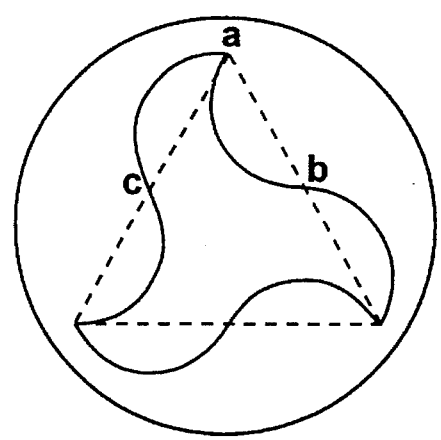
FIG. 4 is a top view of the head of the eagle wing tips tamper-proof fastener illustrating the radii of curvatures of right and left walls of the three recessed channels.
Figure 5:
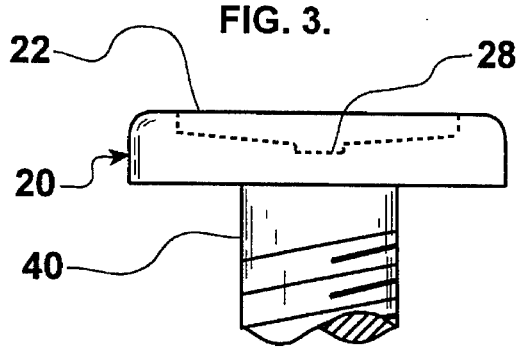
FIG. 5 is a side view of first embodiment of the eagle wing tips tamper-proof fastener.
Figure 6:
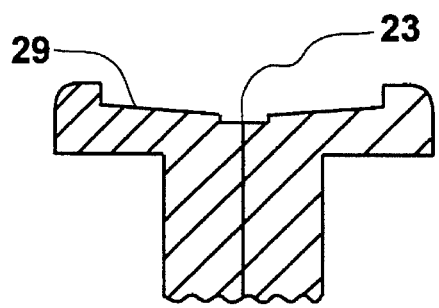
FIG. 6 is a side sectional view of first embodiment of the eagle wing tips tamper-proof fastener.
Figure 7:
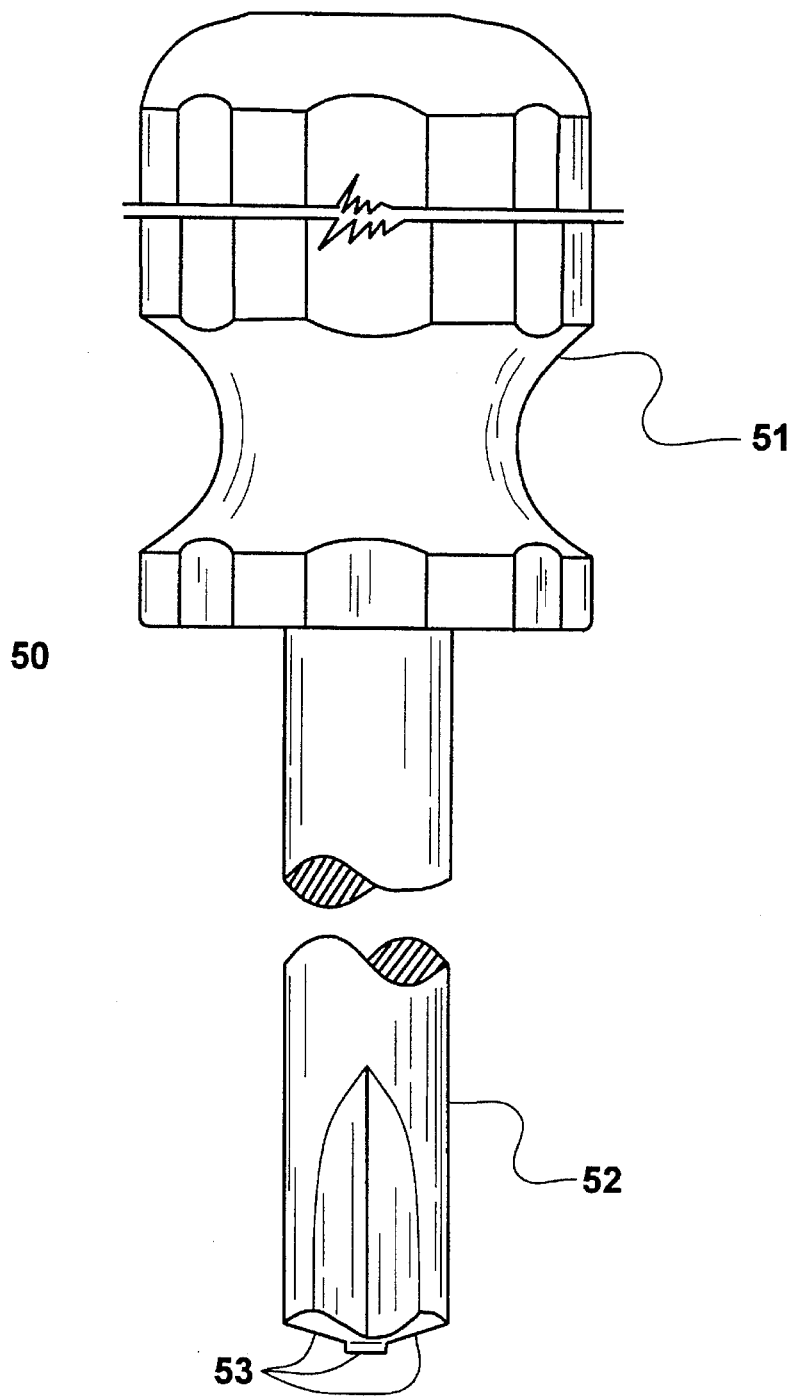
FIG. 7 is a side view of the driver tool for operating the eagle tips tamper-proof fastener.
Figure 8:
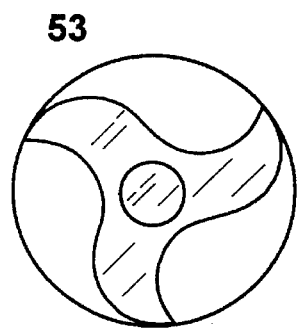
FIG. 8 is a bottom view of the driver tool for operating the eagle wing tips tamper-proof fastener.
Figure 9:
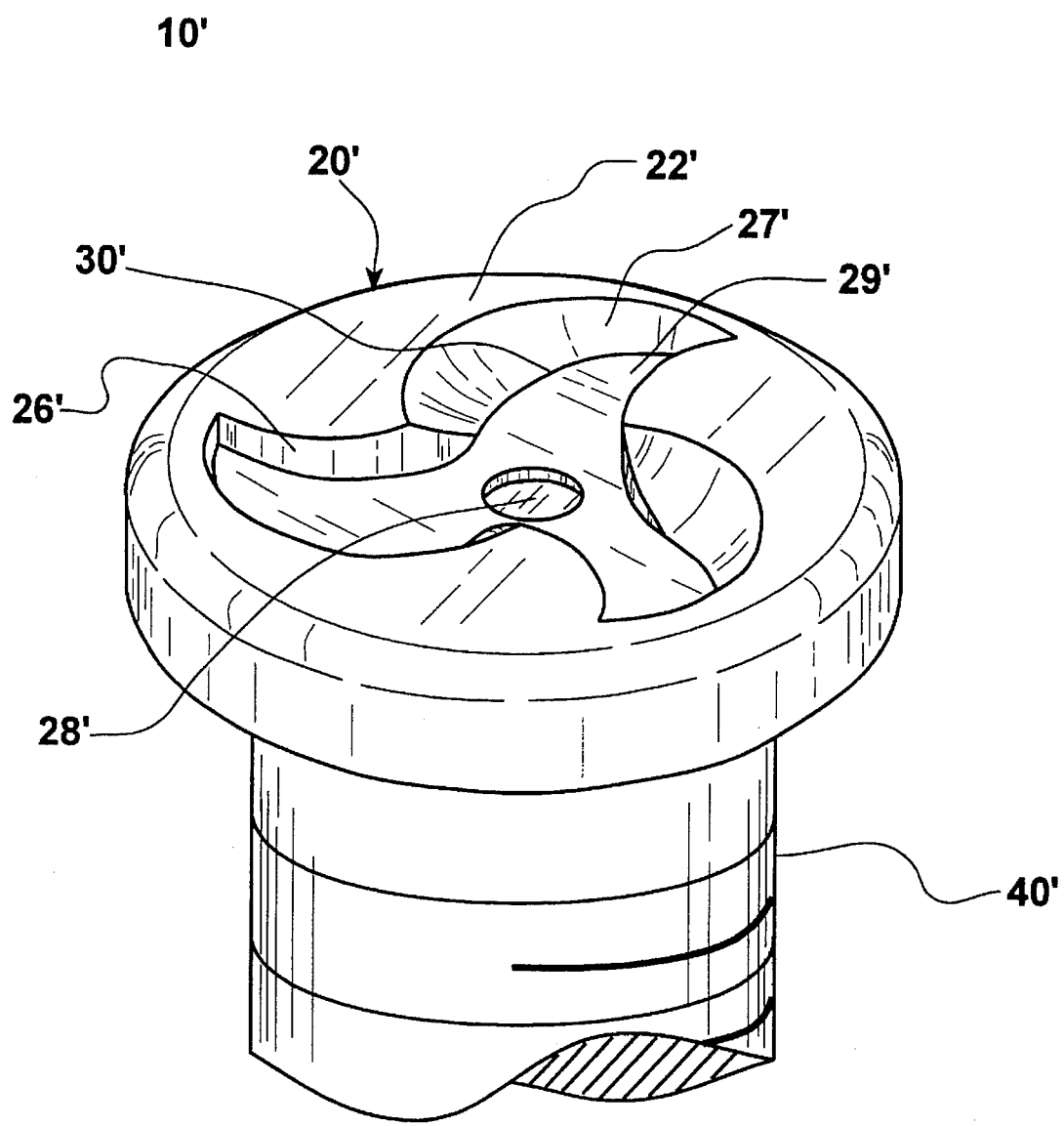
FIG. 9 is a perspective view of an alternate embodiment of the eagle wing tips tamper-proof fastener.
Figure 10:
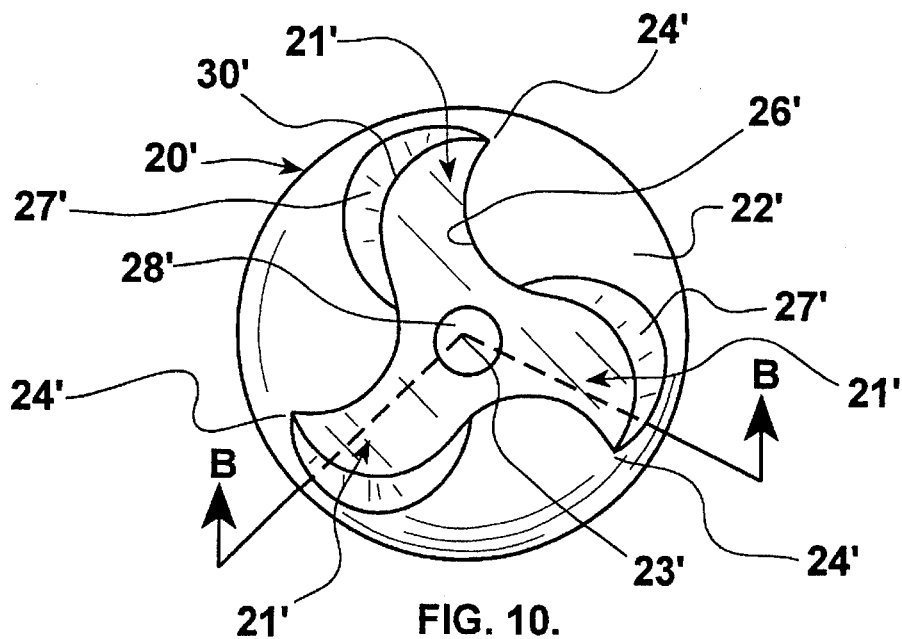
FIG. 10 is a top view of the head of an alternate embodiment of the eagle wing tips tamper-proof fastener.
Figures 11, 12:
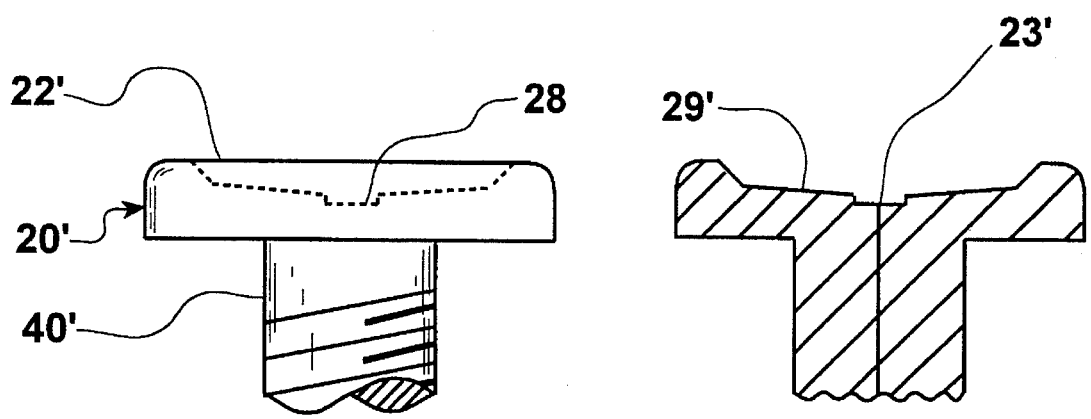
FIG. 11 is a side view of an alternate embodiment of the eagle wing tips tamper-proof fastener.
FIG. 12 is a side sectional view of an alternate embodiment of the eagle wing tips tamper-proof fastener.

Referring to FIG. 1, a fastener 10 is comprised of a head 20 and a conventional threaded shank 40 perpendicularly connected to bottom side of head 20. In the first embodiment illustrated in FIGS. 1–6, the circular and substantially flat tamper-proof head 20 has three recessed channels 21 milled into the top surface 22 of the head 20. Each of three recessed channels 21 radially curves outwards from a common center point 23 at the center of the head 20. Each channel 21 curves to a respective radial endpoint 24 which lies between half radius and full radius of the head 20. The three channels 21 are symmetrically arranged on the top surface 22 of the head 20 as illustrated in FIG. 3 and therefore the imaginary radial lines 25 connecting the center point 23 to each endpoint 24 are 120 degrees from one another. The right vertical wall 26 of each channel 21 smoothly curves to the right as it extends to the endpoint 24. The left vertical wall 27 of each channel 21 also smoothly curves to the right as it extends out to meet and join the endpoint 24 of the right wall 26. As illustrated in FIG. 4, the radius of curvature ab of the right wall 26 is equal to the radius of curvature ac of the left wall 27. As illustrated in FIGS. 5 and 6, at the center point 23 where the three recessed channels 21 meet is a circular, flat surface 28 whose diameter is approximately half of the broadest width of each channel 21. The circular flat surface at 28 the center point 23 being at the deepest portion with respect to the top surface 22 of the fastener head 20, bottom surface 29 of each channel 21 rises linearly from the center to the endpoint 24 of each channel 21. Per FIGS. 7 and 8, a driver tool 50 having a handle 51, a shank 52 and a complementary driving contact 53 is to be used to apply and remove the fastener 10.

In an alternative embodiment as illustrated in FIGS. 9–12, a fastener 10' is comprised of a head 20' and a conventional threaded shank 40' perpendicularly connected to bottom side of head 20'. The circular and substantially flat tamper-proof head 20' has three recessed channels 21' milled into the top surface 22' of the head 20'. Each of three recessed channels 21' radially curves outwards from a common center point 23' at the center of the head 20'. Each channel 21' curves to a respective radial endpoint 24' which lies between half radius and full radius of the head 20'. The three channels 21' are symmetrically arranged on the top surface 22' of the head 20' as illustrated in FIG. 3 and therefore the imaginary radial lines 25 connecting the center point 23' to each endpoint 24' are 120 degrees from one another. The right vertical wall 26' of each channel 21' smoothly curves to the right as it extends to the endpoint 24'. The entire left wall 27' of each channel 21' is, rather than vertical, substantially inclined outwards from its bottom edge 30' and also smoothly curves to the right as it extends out to meet and join the endpoint 24' of the right wall 26'. As illustrated in FIG. 4, the radius of curvature ab of the right wall 26' is equal to the radius of curvature ac of the left wall 27'. At the center point 23' where the three recessed channels 21' meet is a circular, flat surface 28' whose diameter is approximately half of the broadest width of each channel 21'. The circular flat surface at 28' the center point 23' being at the deepest portion with respect to the top surface 22' of the fastener head 20', bottom surface 29' of each channel 21' rises linearly from the center to the endpoint 24' of each channel 21'. Per FIGS. 7 and 8, a driver tool 50 having a handle 51, a shank 52 and a complementary driving contact 53 is to be used to apply and remove the fastener 10'. Once applied, the fastener 10' of the alternative embodiment cannot be removed with the driver tool 50 as torquing the driver tool 50 counter-clockwise will only cause slippage of the driver tool 50 on the inclined surface of left wall 27'.

While the present invention has been disclosed with reference to two particular examples of preferred embodiment, it is the applicant's intention to cover all modifications and equivalents within the scope of the following appended claims. It is therefore requested that the following claims be given a liberal interpretation which is within the spirit and scope of the applicant's contribution to this art.

What is claimed as being new and therefore desired to be protected by letter patent of the United States is as follows:

1. An eagle wing tips tamper-proof fastener in combination with a torque-producing driver tool for operating said fastener comprising:

(A) said eagle wing tips tamper-proof fastener comprising:

(1) a head;
  (a) said head having a generally circular shape;
  (b) said head having a center point;
  (c) wherein said circular shape of said head defines a radius of said head;
  (d) said head having a substantially flat top surface;
  (e) said head having a bottom side;
  (f) said head having a plurality of recessed channels disposed on said top surface of said head;
  (g) wherein said channels are three in number;
  (h) wherein said three channels are symmetrically arranged on said top surface of said head;
  (i) each said channel comprising a right wall, a left wall, a bottom surface and an endpoint;
  (j) wherein said channels radially curve outwards from said center point of said head;
  (k) wherein said channels curve to their respective said radial endpoints located between half of said radius and said full radius of said head;
  (l) wherein said right wall is substantially vertical with respect to said top surface of said head;
  (m) wherein said left wall is substantially vertical with respect to said top surface of said head;
  (n) said right wall having a constant radius of curvature;
  (o) said left wall having a constant radius of curvature;
  (p) wherein said radius of curvature of said right wall is equal in magnitude to said radius of curvature of said left wall;
  (q) wherein said right wall smoothly curves to right at said radius of curvature as it extends to said endpoint;
  (r) wherein said left wall smoothly curves to right at said radius of curvature as it extends to and meets said right wall at said endpoint;
  (s) said head having a recessed circular flat surface disposed at said center of said head;
  (t) said circular shape of said flat circular surface defining a diameter of said circular flat surface;
  (u) wherein magnitude of said diameter of said flat circular surface is approximately half of magnitude of broadest width of said channels;
  (v) wherein said circular flat surface is vertically disposed at deepest point with respect to said top surface of said head; and
  (w) wherein said bottom surface of each said channel rises linearly from said center of said head to said endpoint of each said channel; and
(2) a conventional threaded shank perpendicularly connected to said bottom side of said head; and
(B) said torque-producing driver tool for operating said fastener comprising:
  (1) a conventional handle; and
  (2) a shank;
    (a) said shank having a first end and a second end;
    (b) wherein said first end of said shank is connected to said handle and longitudinally extends therefrom;
    (c) said second end of said shank having a cross-sectional signature substantially complementary in size and shape to said three recessed channels of said head of said fastener; and
    (d) wherein inserting said second end of said shank into said three recessed channels of said head of said fastener results in a substantially matable engagement.

2. An eagle wing tips tamper-proof fastener as set forth in claim 1, wherein said right walls and said left walls of said channels provide vertical surfaces whereby application of torque allows said fastener to rotate to right and to left, respectively.

3. An eagle wing tips tamper-proof fastener in combination with a torque-producing driver tool for operating said fastener comprising:
(A) said eagle tips tamper-proof fastener comprising:
  (1) a head;
    (a) said head having a generally circular shape;
    (b) said head having a center point;
    (c) wherein said circular shape of said head defines a radius of said head;
    (d) said head having a substantially flat top surface;
    (e) said head having a bottom side;
    (f) said head having a plurality of recessed channels disposed on said top surface of said head;
    (g) wherein said channels are three in number;
    (h) wherein said three channels are symmetrically arranged on said top surface of said head;
    (i) each said channel comprising a right wall, a left wall, a bottom surface and an endpoint;
    (j) each said channel further comprising a right bottom edge disposed at where said right wall meets said bottom surface and a left bottom edge disposed at where said left wall meets said bottom surface;
    (k) wherein said channels radially curve outwards from said center point of said head;
    (l) wherein said channels curve to their respective said radial endpoints located between half of said radius and said full radius of said head;
    (m) wherein said right wall is substantially vertical with respect to said top surface of said head;
    (n) wherein said left wall inclines outwards from said left bottom edge;
    (o) said right wall having a constant radius of curvature;
    (p) said left wall having a constant radius of curvature;
    (q) wherein said radius of curvature of said right wall is equal in magnitude to said radius of curvature of said left wall;
    (r) wherein said right wall smoothly curves to right at said radius of curvature as it extends to said endpoint;
    (s) wherein said left wall smoothly curves to right at said radius of curvature as it extends to and meets said right wall at said endpoint;
    (t) said head having a recessed circular flat surface disposed at said center of said head;
    (u) said circular shape of said flat circular surface defining a diameter of said circular flat surface;
    (v) wherein magnitude of said diameter of said circular flat surface is approximately half of magnitude of broadest width of said channels;

- (w) wherein said circular flat surface is vertically disposed at deepest point with respect to said top surface of said head; and
- (x) wherein said bottom surface of each said channel rises linearly from said center of said head to said endpoint of each said channel; and
- (2) a conventional threaded shank perpendicularly connected to said bottom side of said head; and
- (B) said torque-producing driver tool for operating said fastener comprising:
  - (1) a conventional handle; and
  - (2) a shank;
    - (a) said shank having a first end and a second end;
    - (b) wherein said first end of said shank is connected to said handle and longitudinally extends therefrom;
    - (c) said second end of said shank having a cross-sectional signature substantially complementary in size and shape to said three recessed channels of said head of said fastener; and
    - (d) wherein inserting said second end of said shank into said three recessed channels of said head of said fastener results in a substantially matable engagement.

4. An eagle wing tips tamper-proof fastener as set forth in claim 3, wherein said right walls of said channels provide vertical surfaces whereby application of torque allows said fastener to rotate to right and wherein said inclined left walls of said channels provide substantially inclined surfaces whereby application of torque is not allowed and thereby effectively locking said fastener.

* * * * *